United States Patent [19]

Ruhter

[11] Patent Number: 4,696,486
[45] Date of Patent: Sep. 29, 1987

[54] REAR STEER ANGLE INDICATOR FOR ARTICULATING VEHICLE

[75] Inventor: Martin L. Ruhter, Dubuque, Iowa
[73] Assignee: Deere & Company, Moline, Ill.
[21] Appl. No.: 821,385
[22] Filed: Jan. 21, 1986
[51] Int. Cl.⁴ .............................................. B60Q 1/00
[52] U.S. Cl. .................................... 280/400; 280/432; 340/52 R
[58] Field of Search ....... 280/400, 432, 477, DIG. 14; 116/28 R; 33/264; 340/52 R

[56] References Cited

U.S. PATENT DOCUMENTS

| | | | |
|---|---|---|---|
| 2,754,499 | 7/1956 | Jost | 340/52 R X |
| 2,886,299 | 5/1959 | Heimaster et al. | 116/28 R X |
| 3,250,547 | 5/1966 | Myers | 280/432 |
| 3,833,928 | 9/1974 | Gavit et al. | 340/52 R |
| 3,947,839 | 3/1976 | Zigmant | 340/52 R |
| 4,008,466 | 2/1977 | Smith | 340/52 R |
| 4,122,390 | 10/1978 | Kollitz et al. | 280/432 X |
| 4,221,273 | 9/1980 | Finden | 180/6.48 |
| 4,465,292 | 8/1984 | Fry et al. | 280/95 R |

Primary Examiner—John J. Love
Assistant Examiner—Mitchell J. Hill
Attorney, Agent, or Firm—Henderson & Sturm

[57] ABSTRACT

A rear steer angle indicator unit for an agricultural or earth moving tractor having a steerable mainframe articulately connected to an independently wheel-mounted rear engine frame: the rear steer indicator unit comprising a sensing unit (33) capable of converting mechanical motion to electrical signals and mounted on a portion (22) of a mainframe (12) spaced away from the articulation joint (18) for the tractor (11); a gauge (37) mounted in the tractor cab (13) and electrically connected to the sensing unit (33) for receiving signals therefrom indicating the direction of movement of the engine frame (14) relative to the mainframe (12); a sensing arm unit (40) mounted independently of the sensing unit (33) in a bushing (42) provided therefore in a portion (22) of the mainframe (12); and a linkage unit (45) connected between the sensing arm unit (40) and a tongue member (27) of the engine frame (14) for translating movement of the engine frame (14) to rotation of the sensing arm (40) within the sensing unit (33); all parts of the indicator unit (10) being protected from inadvertent stepping of the operator and maintenance personnel, rocks, debris and the like, such protection afforded by the provision of side and bolster plates affixed to the mainframe (12) below the cab (13) and to one side of the indicator unit (10).

5 Claims, 2 Drawing Figures

REAR STEER ANGLE INDICATOR FOR ARTICULATING VEHICLE

TECHNICAL FIELD

This invention relates to agricultural and earth moving vehicles having articulating portions, and more particularly to apparatus for indicating to the operator the angle of articulation between the articulating portions to aid in steering the vehicle.

BACKGROUND ART

There are two known means and methods for indicating the angle of articulation between the front portion of an articulating vehicle, a motor grader for example, and the rear engine portion. One comprises a mechanical linkage connected at the articulation joint, which mechanical linkage extends to a sliding arrow indicator viewable by the operator.

A second means comprises an electrical system with a sensor attached at the articulation joint, which sensor operates a gauge in view of the operator.

The known prior art in this field has several disadvantages. Both the mechanical linkage and the sensor attached at the articulation joint are subject to inadvertent damage by the operator stepping thereon, also by maintenance personnel; by debris thrown from the moving tires or due to the engine fan. The placement of the sensor at the articulation joint subjects it to being overstressed by the actuation linkage, and adjustment of the sensor is complicated by requiring actuation linkage disconnection. The use of electrical parts allows greater versatility; however, as these parts are more delicate, greater protection is required due to their industrial operating environment.

Those concerned with these and other problems recognize the need for an improved rear steer angle indicator for articulating vehicles of this type.

DISCLOSURE OF THE INVENTION

The present invention relates to a vehicle having a steerable wheel mounted mainframe and a wheel mounted engine frame articulately mounted to the rear of the mainframe, the articulation joint comprising a forwardly extended tongue portion on the engine frame and a rearwardly extended plate mounted on a plate portion of the mainframe, both plates pivotally connected by a vertically disposed pin. The improved rear steer sensing mechanism for indicating to the operator the position of the engine frame relative to the mainframe comprises a sensor mounted to the plate portion of the mainframe away from the articulation joint, and which sensor is capable of converting mechanical motion to electrical signals; a gauge mounted in the cab portion of the tractor which is electrically connected to the sensor and capable of indicating the degree and direction of movement of the engine frame relative to the mainframe; a sensing arm unit one portion of which is inserted through the mainframe plate portion for connection with the sensor, such that the sensor may be adjusted without affecting the connection with the sensing arm, another portion of the sensing arm depending alongside the plate portion for connection with a linkage means; one end of the linkage means connected to the sensing arm depending portion and the other end connected to the tongue of the engine frame whereby movement of the tongue in a horizontal plane is transmitted by the linkage unit to arcuate motion of the sensing arm about its connection with the sensor.

By this arrangement, arcuate movement of the engine frame as indicated by its tongue in a horizontal plane is translated to electrical signals by the sensor transmitted in turn to the gauge to thereby indicate the degree and direction of movement of the engine frame relative to the mainframe, thereby aiding the operator in steering the articulating tractor.

An object of the present invention is the provision of an improved articulating vehicle sensor for indicating the relationship of the engine frame to the mainframe of the vehicle.

Another object of this invention is the provision of a position sensing unit for an articulating vehicle wherein the sensing apparatus is well protected against inadvertent damage by stepping of the operator or maintenance personnel, debris thrown from the moving tires or due to the engine fan, and the like.

Yet another object of this invention is to provide a position sensor unit wherein the actuation linkage is supported relative to the sensor such that forces cannot be transmitted directly to the position sensor.

Still another object of this invention is to provide a position sensing unit wherein the position sensor itself does not require disassembly from its actuation linkage for fine adjustments to the position sensor.

Yet another object of this invention is to provide a position sensing arrangement wherein the position sensor is independently mounted relative to the actuation linkage therefor such that the position sensor may not be overstressed by the actuation linkage.

BRIEF DESCRIPTION OF THE DRAWINGS

These and other attributes of the invention will become more clear upon a thorough study of the following description of the Best Mode For Carrying Out The Invention, particularly when reviewed in conjunction with the drawings, wherein.

BEST MODE FOR CARRYING OUT THE INVENTION

Figure 1:
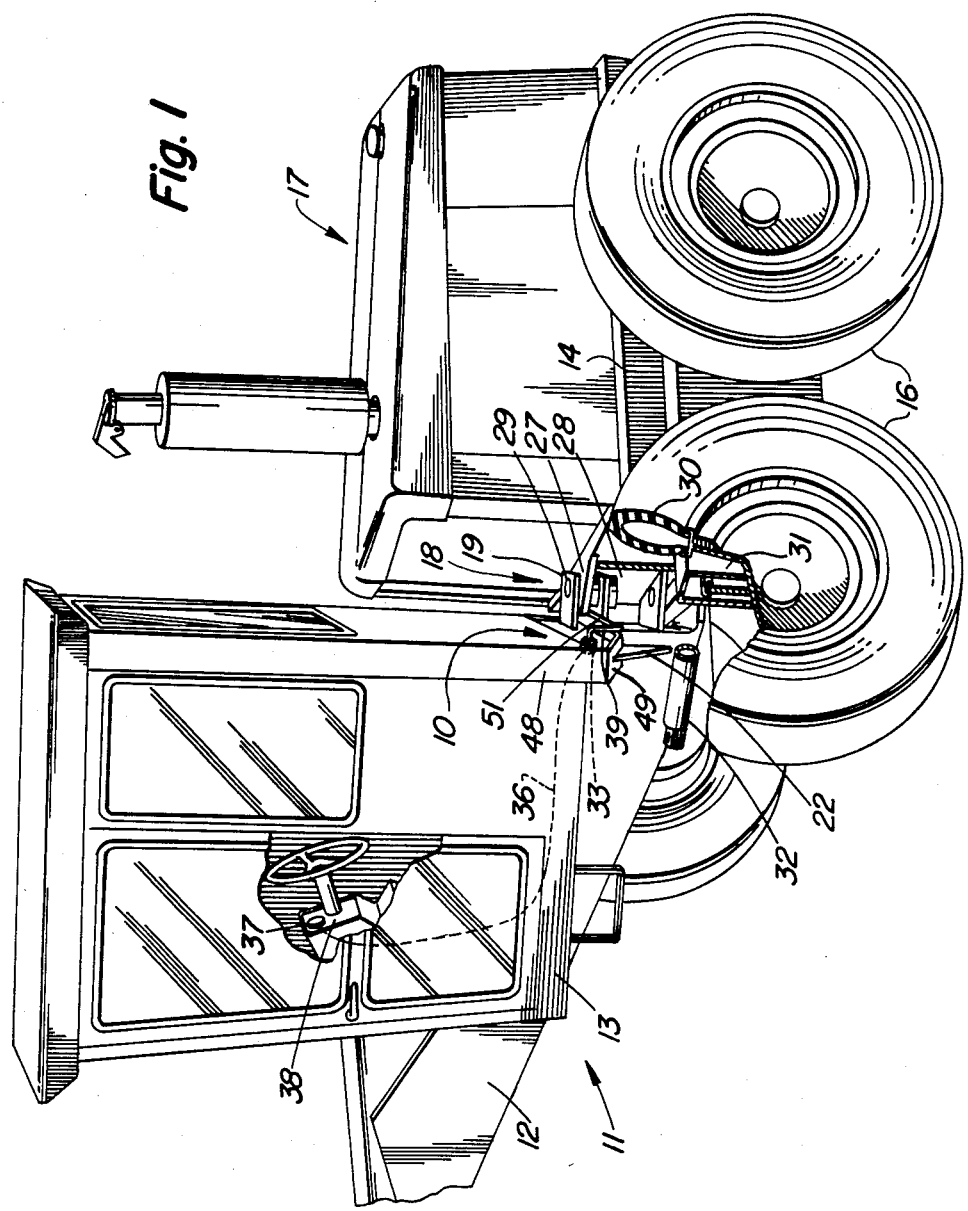
FIG. 1 is a perspective view of an agricultural vehicle, such as a motor grader, the view being partial and with certain parts cut away and shown in section for clarity of showing the invention.
Figure 2:
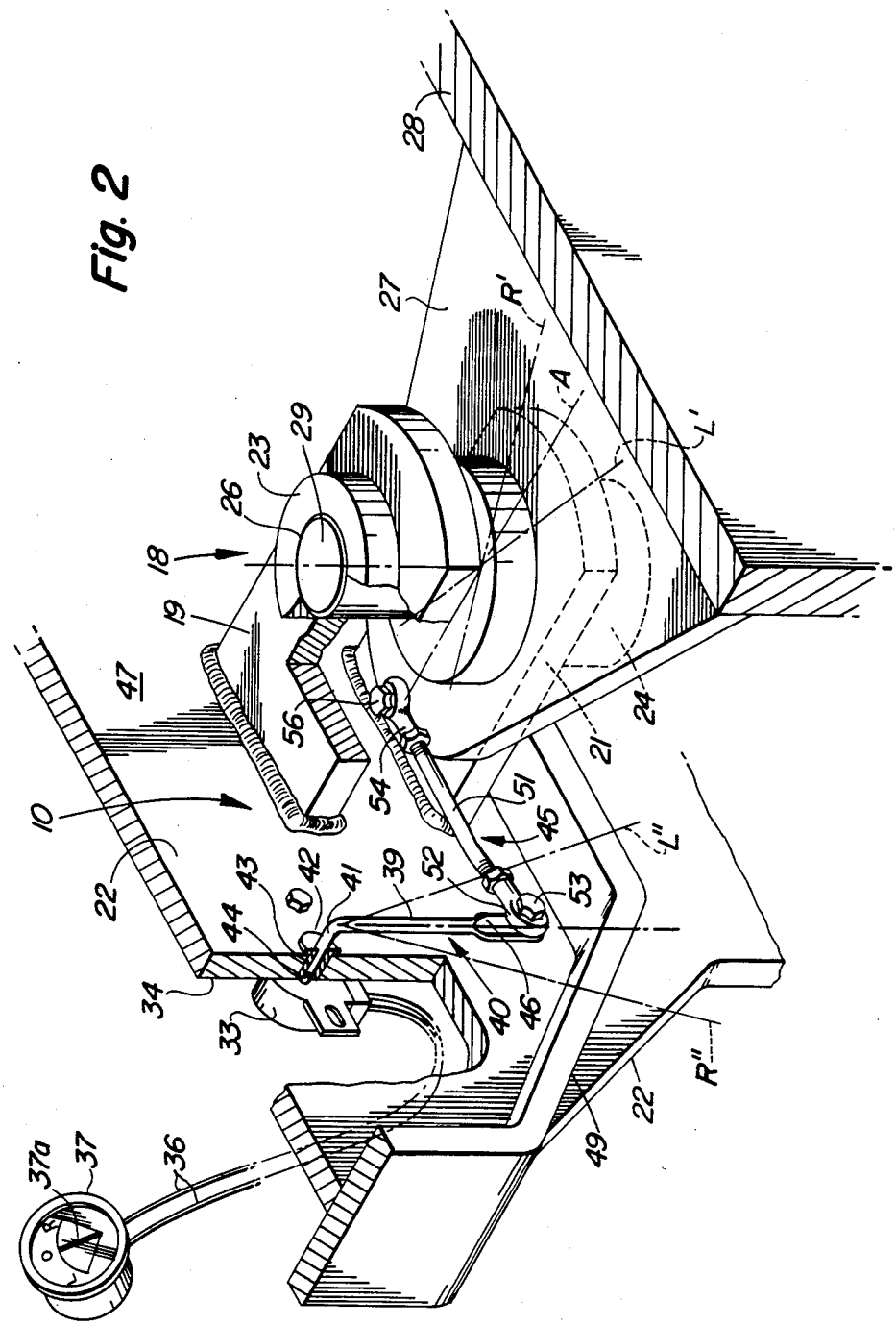
FIG. 2 is an enlarged perspective view, again with certain parts broken away and others shown in section for purposes of clarity.

Referring now to the drawings, wherein like reference numerals designate identical or corresponding parts throughout the several views, the rear steer angle indicator unit of this invention, termed also a position sensing unit herein, is indicated generally at (10) in FIGS. 1 and 2. The unit (10) is mounted in a manner described hereinafter on an agricultural tractor (11), such as a motor grader, having a steerable mainframe (12) mounted on front wheels (not shown) and including an operator's station, such as a cab (13). The tractor (11) includes also an engine frame (14) articulately mounted to the rear of the mainframe (12), the engine frame (14) being mounted on wheels (16) and including an engine compartment indicated generally at (17).

An articulation joint indicated generally at (18) in FIGS. 1 and 2 is provided for articulately connecting the mainframe (12) to the engine frame (14), the joint (18) including a pair of rearwardly extending plates (19) and (21) (FIG. 2), the plates secured as by welding to a mainframe rear, upright plate portion (22). The upper plate (19) is provided with a raised circular bearing portion (23), and the lower plate (21), spaced vertically below the upper plate (19), is also provided with a raised bearing portion (24) on the bottom thereof. Aligned bores (26) (not shown in plate 21) are formed in the plates (19) and (21).

A tongue member (27) is extended forwardly from its securement to an engine frame plate (28) (FIG. 2), which tongue (27) has an opening formed therein (not shown) for alignment with the aligned bores (26) of the plates (19) and (21). A connecting pin (29) mounted normally on a vertical axis secures the plates (19), (21) and the tongue (2,7) by passing through the bores and openings provided therefor. In this manner, the engine frame (14) and the mainframe (12) of the tractor (11) are pivotally movable, generally in horizontal planes, relative to each other and at an angular degree determined by the physical makeup of the mainframe (12) and the engine frame (14).

Referring to FIG. 2, certain parts are cut away and shown in section in order to clearly show the location of the angle indicator unit (10). One of the engine frame tires (30) is cut away, a channel portion (31) of the engine frame is also cut away, as is a hydraulic cylinder (32) mounted beneath the cab (13).

The rear steer angle indicator unit (10) of this invention comprises generally a sensing unit (33) (FIG. 2) which is capable of converting mechanical motion to electrical signals; a gauge (37) electrically connected to the sensing unit (33) and capable of indicating the degree and direction of movement of the engine frame (14) relative to the mainframe (12); a sensing arm unit (40) which is inserted through the upright plate portion (22) of the mainframe (12) and connected with the sensing unit (33); and a linkage unit (45) interconnected between the engine frame tongue member (27) and the sensing arm unit (40) for transmitting horizontal movement of the engine frame (14) relative to the mainframe (12) to the sensing arm unit (40), which motion is transmitted electrically to the gauge (37) for viewing by the operator in the cab (13).

More particularly, the sensing unit (33) comprises a commercially available unit for converting mechanical motion, as from the sensing arm unit (40), to electrical signals. The sensing unit (33) is mounted on the front surface (34) of the upright plate portion (22) such that the sensor (33) is mounted away from the articulation joint (18), being separated therefrom by the plate portion (22). Lead lines (36) from the sensor (33) for conducting current to the gauge in the cab (13) are provided. The gauge (37) is conventional and has a needle (37a) which is swingable from a straight up position indicating that the mainframe (12) and the engine frame (14) are in alignment, to a left-hand position indicated by the letter "L", and swingable also into a right-hand position indicated by the letter "R" on the gauge (37). A swing of the needle (37a) to "L" indicates that the engine frame (14) has swung to the left rear of the mainframe (12), and movement of the needle to the right to "R" is an indication that the engine frame (14) has swung to the right rear of the mainframe (12). For best viewing, the gauge (37) is mounted on the instrument panel (38) of the cab (13).

Referring best to FIG. 2, the sensing arm unit (40) includes an arrow-shaped sensing arm (39) which has an upper portion (41) extended normally horizontally through a resilient bushing (42) inserted in an opening (43) formed in the plate portion (22). A snap ring (44) inserted in a groove (not shown) formed in the upper portion (41) of the sensing arm (39) prevents the sensing arm (39) from being inadvertently withdrawn from the bushing (42). The sensing arm (39) includes further a depending arm portion (46) from the upper portion (41), which depending portion (46) extends parallel and closely adjacent the rear surface (47) of the upright plate portion (22) of the mainframe (12).

The linkage unit indicated generally at (45) in FIG. 2 comprises a link (51) having an outer end (52) connected by a bolt (53) to the lower end of the depending arm portion (46) of the sensing arm (39), and includes further an inner end (54) turned 90° to the position of the outer end (52), and which inner end (54) is connected by a bolt (56) to the upper surface of the tongue member (27).

To protect the indicator unit (10) from inadvertent stepping thereon of the operator or maintenance personnel, or from debris thrown from the moving tires (16) or blasting forwardly from the engine compartment (17), the side plate portion (48) of the engine cab (13) depends laterally of the sensing unit (33), the sensing arm unit (40) and the linkage unit (45), and further a pair of bolster plates (49) secured to either side of the mainframe plate portion (22) are also secured below the sensing unit (33), sensing arm unit (40) and linkage unit (45). The width of the plates (48) and (49) is such as to protect the indicator unit (10) from movement of foreign objects toward the sensing unit (10) from the side of the tractor (11).

Referring to FIG. 2, the operation of the indicator unit (10) can be clearly seen in that lines L' and R' struck through the axes of the connecting pin (29) indicate movement of the engine frame (14) to the left and to the right of the mainframe (12). As the tongue member (27) and the engine frame (14) move toward the L' position for the engine frame (14), it will be seen that the linkage unit (45) is moved to the right, thus moving the depending portion (46) of the sensing arm unit (40) to the L" position of the sensing arm (39). In the sensing unit (33), this movement of the sensing arm (39) to the L" position is electrically translated and carried via the lead lines (36) to the gauge (37) wherein the needle (37a) is moved to the "L" position of the gauge, thereby the operator is made visually aware of the movement of the engine frame (14) to the L' position of FIG. 2. Likewise, movement of the engine frame (14) to the right, L', of longitudinal alignment with the mainframe (12) as indicated by the imaginary line "A" indicated in FIG. 2 will push the linkage unit (45) to its R" position, resulting in the gauge (37) needle (37a) swinging to its "R" position, indicating to the operator that the engine frame (14) is to the left rear of the mainframe (12) direction.

It is to be noted that in view of the connection of the sensing arm upper portion (41) with the sensor (33), the sensor (33) may be adjusted in a normal manner without disconnecting the sensing arm (39) therefrom. Furthermore, due to the structure of the linkage unit (45), movement of the link (51) in a normally horizontal direction provides for actual movement of the linkage unit (45) in a vertical plane to accommodate the arcuate, pendulum-type movement of the sensing arm (39) in a vertical plane.

Thus, it can be seen that at least all of the stated objectives have been achieved.

Obviously, many modifications and variations of the present invention are possible in light of the above teachings. It is therefore to be understood that, within the scope of the appended claims, the invention may be practiced otherwise than as specifically described.

I claim:

1. In a vehicle having a steerable wheelmounted mainframe and a wheelmounted engine frame articulately mounted to the rear of the mainframe, the articulation joint comprising a forwardly extended, horizontally disposed tongue portion on the engine frame and a rearwardly extended horizontally disposed plate mounted on a vertically disposed plate portion of the mainframe, both plate and tongue portion pivotally connected by a vertically disposed pin, an improved rear steer angle indicator unit comprising:

sensing means capable of converting mechanical motion to electrical signals, said sensing means mounted on the side of said vertically disposed mainframe plate portion opposite the articulation joint;

gauge means electrically connected to said sensing means and capable of indicating the degree and direction of movement of the engine frame relative to the mainframe;

sensing arm means inserted through said vertically disposed mainframe plate portion and connected with said sensing means, said sensing arm means comprising an L-shaped arm the upper portion of which is inserted into said sensing means about a normally horizontal axis, and the lower portion of which depends from the upper portion parallel and closely adjacent a rear face of said vertically disposed mainframe plate portion; and linkage means connected at one end thereof to the engine frame tongue at a location between said tongue and said plate, and at the other end thereof to said sensing arm means, whereby movement of the tongue relative to said vertically disposed mainframe plate portion results in like amount of movement of said sensing arm means in said sensing means and consequent indication by said gauge means of the degree and direction of movement of the engine frame relative to the mainframe.

2. The invention of claim 1 and further wherein the plate portion has an opening formed therein and a resilient bushing inserted into said opening, said bushing rotatably receiving said arm upper portion.

3. The invention of claim 2 and further wherein said sensing means is adjustable without manipulating said sensing arm means.

4. The invention of claim 2 and further wherein said linkage means one end receives movement in a horizontal plane, and said other end transmits movement in a vertical plane, the linkage means end connections allowing movement of said linkage means itself in a horizontal plane to accommodate arcuate movement of said sensing arm lower portion about the circular movement in place of said sensing arm upper portion..

5. The invention of claim 4 and further wherein a flat side plate is mounted at right angles to an outer edge of said vertically disposed maniframe plate portion, and further wherein a pair of flat bolster plates are mounted at right angles on either side of said vertically disposed mainframe plate portion, said side plate and said bolster plates located laterally of and partially below said sensing means, said sensing arm means and said linkage means for protection against moving toward said sensing, sensing arm and linkage means objects from the side of and below same.

* * * * *